(12) United States Patent
Olley

(10) Patent No.: US 9,124,936 B2
(45) Date of Patent: Sep. 1, 2015

(54) MIXED MODE TELEVISION RECEIVER

(71) Applicant: EchoStar Technologies L.L.C., Englewood, CO (US)

(72) Inventor: Thomas P. Olley, Atlanta, GA (US)

(73) Assignee: ECHOSTAR TECHNOLOGIES L.L.C., Englewood, CO (US)

(*) Notice: Subject to any disclaimer, the term of this patent is extended or adjusted under 35 U.S.C. 154(b) by 64 days.

(21) Appl. No.: 14/135,180

(22) Filed: Dec. 19, 2013

(65) Prior Publication Data

US 2015/0181293 A1    Jun. 25, 2015

(51) Int. Cl.
| | |
|---|---|
| H04N 7/10 | (2006.01) |
| H04N 7/025 | (2006.01) |
| H04N 21/462 | (2011.01) |
| H04N 21/414 | (2011.01) |
| H04N 21/472 | (2011.01) |
| H04N 21/485 | (2011.01) |
| H04N 21/81 | (2011.01) |
| H04N 21/426 | (2011.01) |
| H04N 21/439 | (2011.01) |
| H04N 21/44 | (2011.01) |
| H04N 21/61 | (2011.01) |

(52) U.S. Cl.
CPC ........... *H04N 21/462* (2013.01); *H04N 21/414* (2013.01); *H04N 21/4263* (2013.01); *H04N 21/439* (2013.01); *H04N 21/44* (2013.01); *H04N 21/47205* (2013.01); *H04N 21/4852* (2013.01); *H04N 21/6143* (2013.01); *H04N 21/8133* (2013.01)

(58) Field of Classification Search
CPC ................ H04N 21/439; H04N 21/44; H04N 21/47205; H04N 21/4852
See application file for complete search history.

(56) References Cited

U.S. PATENT DOCUMENTS

| | | | |
|---|---|---|---|
| 5,886,995 A * | 3/1999 | Arsenault et al. | ............. 370/477 |
| 2007/0098351 A1 * | 5/2007 | East et al. | ........................ 386/46 |

* cited by examiner

*Primary Examiner* — Joshua Taylor
(74) *Attorney, Agent, or Firm* — Kilpatrick Townsend & Stockton LLP

(57) ABSTRACT

Systems and methods that enable satellite television subscribers to simultaneously watch video associated with a primary television channel and listen to audio associated with a different secondary television channel.

18 Claims, 8 Drawing Sheets

MIXED MODE TELEVISION RECEIVER

BACKGROUND

The advent of the digital video recorder and the availability of high-capacity and affordable computer-readable storage devices have made available many possibilities to television programming service providers and viewers alike. In addition, television viewers have come to expect flexibility and convenience with respect to the accessing of content via their television receivers.

SUMMARY

This Summary does not in any way limit the scope of the claimed subject matter.

In an aspect, a method may include outputting, by a television receiver, audio and video associated with a first television channel to a presentation device for output by the presentation device. The method may include receiving, by the television receiver, a request to output audio associated with a second television channel to the presentation device for output by the presentation device. The method may include outputting, by the television receiver in response to the receiving the request, only video associated with the first television channel, and audio associated with the second television channel, to the presentation device both for output by the presentation device.

In an aspect, a television receiver may include one or more processors; and a memory communicatively coupled with and readable by the one or more processors and having stored therein processor-readable instructions. The processor-readable instructions may when executed by the one or more processors cause the one or more processors to output audio and video associated with a first television channel to a presentation device for output by the presentation device. The processor-readable instructions may when executed by the one or more processors cause the one or more processors to detect a request to output audio associated with a second television channel to the presentation device for output by the presentation device. The processor-readable instructions may when executed by the one or more processors cause the one or more processors to output in response to the receiving the request, video associated with the first television channel, and audio associated with the second television channel, to the presentation device both for output by the presentation device.

In an aspect, a method for operating a television receiver in a mixed mode may include outputting by the television receiver audio and video associated with a first television channel to a presentation device. The method may include outputting by the television receiver to the presentation device an indicator that when selected generates a request to output audio associated with a second television channel simultaneously with the video associated with the first television channel. The method may include receiving by the television receiver a request to output audio associated with the second television channel to the presentation device. The method may include outputting by the television receiver in response to receiving the request video associated with the first television channel, and audio associated with the second television channel, to the presentation device both for output by the presentation device. The method may include outputting to the presentation device for display by the presentation device closed-captioning content associated with the first television channel. The method may include outputting to the presentation device for display by the presentation device textual content associated with the audio of the second television channel.

DETAILED DESCRIPTION

The present disclosure is directed to or towards systems and methods that enable satellite television subscribers to simultaneously watch video associated with a primary television channel and listen to audio associated with a different secondary television channel. This is different than PIP (Picture-In-Picture) whereby audio and video of one television channel may be presented, the video within a first television pane, simultaneously with video of another television channel within a second television pane. In some embodiments, audio and/or video of the primary television channel may generally be transmitted via satellite on a different or distinct signal than audio and/or video of the secondary television channel. In some embodiments, closed-captioning text associated with the primary television channel may also be displayed with the video associated with that channel. In this manner, a television viewer may more fully engage in watching the video associated with the primary television channel, while simultaneously listening to the audio associated with the different secondary television channel. Such features may, among other things, serve to entice new customers to subscribe to services as offered by a particular satellite television provider, as well as provide an incentive for existing customers to maintain their loyalty and/or relationship with the particular satellite television provider. Although not so limited, an appreciation of the various aspects of the present disclosure may be gained from the following discussion in connection with the drawings.

Figure 1:
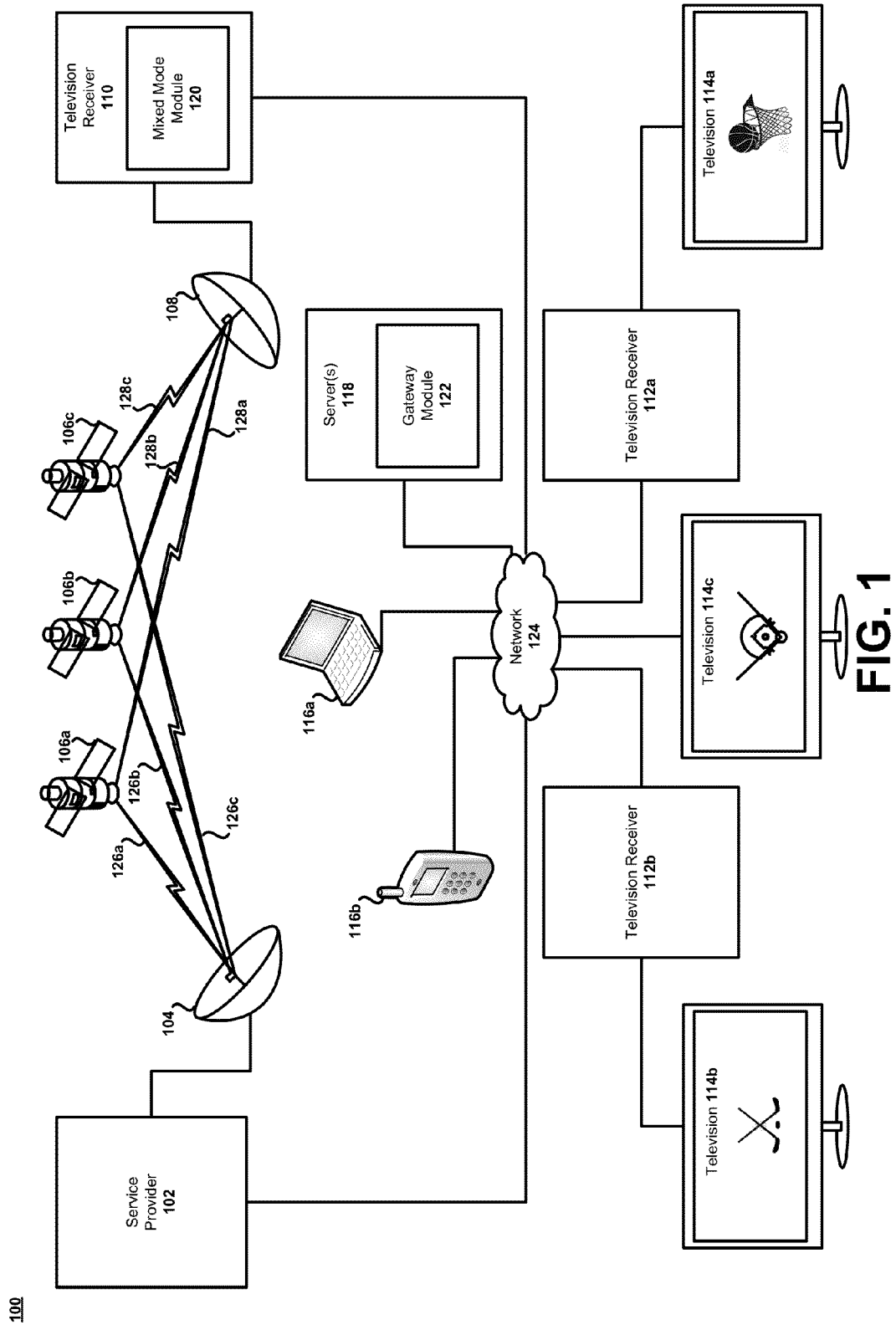
FIG. 1 shows an example satellite system in accordance with the disclosure.

For instance, FIG. 1 illustrates an example satellite television distribution system 100 in accordance with the present disclosure. For brevity, the system 100 is depicted in a simplified form, and may include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of content distribution system as desired.

The example system 100 may include a service provider 102, a satellite uplink 104, a plurality of satellites 106*a-c*, a satellite dish 108, a PTR (Primary Television Receiver) 110, a plurality of STRs (Secondary Television Receivers) 112*a-b*, a plurality of televisions 114*a-c*, a plurality of computing devices 116*a-b*, and at least one server 118 that may be associated with the service provider 102. Additionally, the PTR 110 may include a mixed mode module 120, and the server 118 may include a gateway module 122.

In some embodiments, the mixed mode module 120 together or in tandem with the gateway module 122 may be configured and arranged to implement various features associated with enabling satellite television subscribers to simultaneously watch video associated with a primary television channel and listen to audio associated with a different secondary television channel. In some embodiments, the mixed mode module 120 together or in tandem with the gateway module 122 may further enable satellite television subscribers to perform various tasks such as allow subscribers to purchase and/or obtain various information about currently playing audio associated with the different secondary television channel. In some embodiments, the mixed mode module 120 together or in tandem with the gateway module 122 may be configured and arranged to generate and display targeted advertisements so that the service provider 102 may develop a revenue stream. These and other features are described in further detail below, and such features may be beneficial and/or advantageous in many respects. For example, a television viewer who may or may not be multitasking in other activities while viewing television programming, may listen to background music while occasionally glancing over at the video of a news broadcast utilizing only a single device (e.g., PTR 110) for both media sources. However, other benefits and/or advantages are possible as well, and an appreciation of such benefits and/or advantages may be understood in light of the present disclosure in its entirety.

The system 100 may further include at least one network 124 that establishes a bidirectional communication path for data transfer between and among each respective element of the system 100, outside or separate from the unidirectional satellite signaling path. The network 124 is intended to represent any number of terrestrial and/or non-terrestrial network features or elements. For example, the network 124 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 100.

The PTR 110, and the STRs 112*a-b*, as described throughout may generally be any type of television receiver, television converter, etc., such as a STB for example. In another example, the PTR 110, and the STRs 112*a-b*, may exhibit functionality integrated as part of or into a television, a DVR (Digital Video Recorder), a computer such as a tablet computing device, or any other computing system or device, as well as variations thereof. Further, the PTR 110 and the network 124, together with the STRs 112*a-b* and televisions 114*a-c*, and possibly the computing devices 116*a-b*, may each be incorporated within or form at least a portion of a particular home computing network. Further, the PTR 110 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other embodiments are possible. For example, one or more of the various elements or components of the example system 100 may be configured to communicate in accordance with the MoCA® (Multimedia over Coax Alliance) home entertainment networking standard. Still other embodiments are possible.

In practice, the satellites 106*a-c* may each be configured to receive uplink signals 126*a-c* from the satellite uplink 104. In this example, each the uplink signals 126*a-c* may contain one or more transponder streams of particular data or content, such as one or more particular television channels, as supplied by the service provider 102. For example, each of the respective uplink signals 126*a-c* may contain various media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 106*a-c*.

Further, different media content may be carried using different transponders of a particular satellite (e.g., satellite 106*a*); thus, such media content may be transmitted at different frequencies and/or different frequency ranges. For example, a first and second television channel may be carried on a first carrier frequency over a first transponder of satellite 106*a*, and a third, fourth, and fifth television channel may be carried on second carrier frequency over a first transponder of satellite 106*b*, or, the third, fourth, and fifth television channel may be carried on a second carrier frequency over a second transponder of satellite 106*a*, and etc. Each of these television channels may be scrambled such that unauthorized persons are prevented from accessing the television channels.

The satellites 106*a-c* may further be configured to relay the uplink signals 126*a-c* to the satellite dish 108 as downlink signals 128*a-c*. Similar to the uplink signals 126*a-c*, each of the downlink signals 128*a-c* may contain one or more transponder streams of particular data or content, such as various encoded and/or at least partially electronically scrambled television channels, on-demand programming, etc., in accordance with an allotted carrier frequency and bandwidth. The downlink signals 128*a-c*, however, may not necessarily contain the same or similar content as a corresponding one of the uplink signals 126*a-c*. For example, the uplink signal 126*a* may include a first transponder stream containing at least a first group or grouping of television channels, and the downlink signal 128*a* may include a second transponder stream containing at least a second, different group or grouping of television channels. In other examples, the first and second group of television channels may have one or more television channels in common. In sum, there may be varying degrees of correlation between the uplink signals 126*a-c* and the downlink signals 128*a-c*, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other embodiments are possible.

Continuing with the example scenario, the satellite dish 108 may be provided for use to receive television channels (e.g., on a subscription basis) provided by the service provider 102, satellite uplink 104, and/or satellites 106a-c. For example, the satellite dish 108 may be configured to receive particular transponder streams, or downlink signals 128a-c, from one or more of the satellites 106a-c. Based on the characteristics of the PTR 110 and/or satellite dish 108, however, it may only be possible to capture transponder streams from a limited number of transponders concurrently. For example, a particular tuner of the PTR 110 may be configured to tune to a single transponder stream from a transponder of a single satellite at a time.

Additionally, the PTR 110, which is communicatively coupled to the satellite dish 108, may subsequently select via tuner, decode, and relay particular transponder streams to the television 114c for display thereon. For example, the satellite dish 108 and the PTR 110 may, respectively, be configured to receive, decode, and relay at least one premium HD-formatted television channel to the television 114c. Programming or content associated with the HD channel may generally be presented live, or from a recording as previously stored on, by, or at the PTR 110. Here, the HD channel may be output to the television 114c in accordance with the HDMI/HDCP content protection technologies. Other embodiments are however possible.

Further, the PTR 110 may select via tuner, decode, and relay particular transponder streams to one or both of the STRs 112a-b, which may in turn relay particular transponder streams to a corresponding one of the televisions 114a-b for display thereon. For example, the satellite dish 108 and the PTR 110 may, respectively, be configured to receive, decode, and relay at least one television channel to the television 114a by way of the STR 112a. Similar to the above-example, the television channel may generally be presented live, or from a recording as previously stored on the PTR 110, and may be output to the television 114a by way of the STR 112a in accordance with a particular content protection technology and/or networking standard. Still further, the satellite dish 108 and the PTR 110 may, respectively, be configured to receive, decode, and relay at least one premium television channel to one or both of the computing device 116a-b. Similar to the above-examples, the television channel may generally be presented live, or from a recording as previously stored on the PTR 110, and may be output to one or both of the computing devices 116a-b in accordance with a particular content protection technology and/or networking standard.

Figure 2:
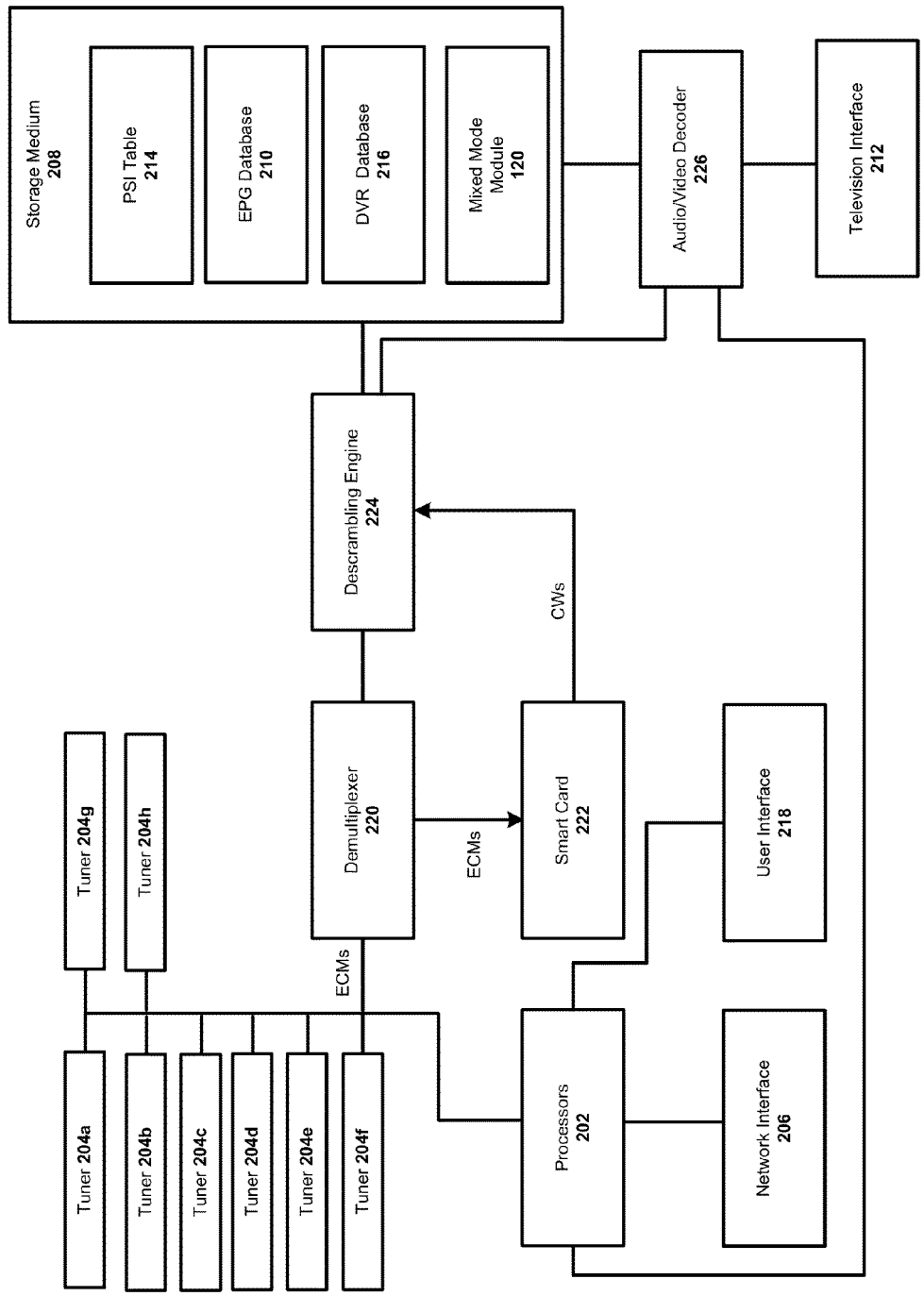
FIG. 2 shows an example block diagram of a television receiver of FIG. 1.

Referring now to FIG. 2, an example block diagram of the PTR 110 of FIG. 1 is shown in accordance with the disclosure. In some embodiments, STRs 112a-b may be configured in a manner similar to that of the PTR 110. In some embodiments, the STRs 112a-b may be configured and arranged to exhibit a reduced functionality as compared to the PTR 110, and may depend at least to a certain degree on the PTR 110 to implement certain features or functionality. The STRs 112a-b in this example may be each referred to as a "thin client."

The PTR 110 may include one or more processors 202, a plurality of tuners 204a-h, at least one network interface 206, at least one non-transitory computer-readable storage medium 208, at least one EPG (Electronic Programming Guide) database 210, at least one television interface 212, at least one PSI (Program Specific Information) table 214, at least one DVR database 216, at least one user interface 218, at least one demultiplexer 220, at least one smart card 222, at least one descrambling engine 224, and at least one decoder 226. In other embodiments, fewer or greater numbers of components may be present. Further, functionality of one or more components may be combined; for example, functions of the descrambling engine 224 may be performed by the processors 202. Still further, functionality of components may be distributed among additional components, and possibly additional systems such as, for example, in a cloud-computing implementation.

The processors 202 may include one or more specialized and/or general-purpose processors configured to perform processes such as tuning to a particular channel, accessing and displaying EPG information, and/or receiving and processing input from a user. For example, the processors 202 may include one or more processors dedicated to decoding video signals from a particular format, such as according to a particular MPEG (Motion Picture Experts Group) standard, for output and display on a television, and for performing or at least facilitating decryption or descrambling.

The tuners 204a-h may be used to tune to television channels, such as television channels transmitted via satellites 106a-c. Each one of the tuners 204a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 204a) may be used to tune to a television channel on a first transponder stream for display using a television, while another tuner (e.g., tuner 204b) may be used to tune to a television channel on a second transponder for recording and viewing at some other time. If multiple television channels transmitted on the same transponder stream are desired, a particular tuner (e.g., tuner 204c) may be used to receive the signal containing the multiple television channels for presentation and/or recording of each of the respective multiple television channels, such as in a PTAT (Primetime Anytime) implementation for example. Although eight tuners are shown, the PTR 110 may include more or fewer tuners (e.g., three tuners, twelve tuners, etc.), and the features of the disclosure may be implemented similarly and scale according to the number of tuners of the PTR 110.

The network interface 206 may be used to communicate via alternate communication channel(s) with a service provider. For example, the primary communication channel between the service provider 102 of FIG. 1 and the PTR 110 may be via satellites 106a-c, which may be unidirectional to the PTR 110, and an another communication channel between the service provider 102 and the PTR 110, which may be bidirectional, may be via the network 124. In general, various types of information may be transmitted and/or received via the network interface 106.

The storage medium 208 may represent a non-transitory computer-readable storage medium. The storage medium 208 may include memory and/or a hard drive. The storage medium 208 may be used to store information received from one or more satellites and/or information received via the network interface 206. For example, the storage medium 208 may store information related to the EPG database 210, the PSI table 214, and/or the DVR database 216, among other elements or features, such as the mixed mode module 120 mentioned above. Recorded television programs may be stored using the storage medium 208.

The EPG database 210 may store information related to television channels and the timing of programs appearing on such television channels. Information from the EPG database 210 may be used to inform users of what television channels or programs are available, popular and/or provide recommendations. Information from the EPG database 210 may be used to generate a visual interface displayed by a television that allows a user to browse and select television channels and/or television programs for viewing and/or recording. Information used to populate the EPG database 210 may be received via the network interface 206 and/or via satellites 106a-c of FIG. 1. For example, updates to the EPG database 210 may be received periodically via satellite. The EPG database 210 may serve as an interface for a user to control DVR functions of the PTR 110, and/or to enable viewing and/or recording of multiple television channels simultaneously.

The decoder 226 may convert encoded video and audio into a format suitable for output to a display device. For instance, the decoder 226 may receive MPEG video and audio from the storage medium 208, or the descrambling engine 224, to be output to a television. MPEG video and audio from the storage medium 208 may have been recorded to the DVR database 216 as part of a previously-recorded television program. The decoder 226 may convert the MPEG video and audio into a format appropriate to be displayed by a television or other form of display device and audio into a format appropriate to be output from speakers, respectively. The decoder 226 may be a single hardware element capable of decoding a finite number of television channels at a given time, such as in a time-division arrangement. In the example embodiment, eight television channels may be decoded concurrently or simultaneously.

The television interface 212 output a signal to a television, or another form of display device, in a proper format for display of video and play back of audio. As such, the television interface 212 may output one or more television channels, stored television programming from the storage medium 208, such as television programs from the DVR database 216 and/or information from the EPG database 210 for example, to a television for presentation.

The PSI table 214 may store information used by the PTR 110 to access various television channels. Information used to populate the PSI table 214 may be received via satellite, or cable, through the tuners 204a-h and/or may be received via the network interface 206 over the network 124 from the service provider 102 shown in FIG. 1. Information present in the PSI table 214 may be periodically or at least intermittently updated. Information that may be present in the PSI table 214 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some embodiments, the PSI table 214 may be divided into a number of tables, such as a NIT (Network Information Table), a PAT (Program Association Table), a PMT (Program Management Table), etc.

Table 1 below provides a simplified example of the PSI table 214 for several television channels. It should be understood that in other embodiments, many more television channels may be represented in the PSI table 214. The PSI table 214 may be periodically or at least intermittently. As such, television channels may be reassigned to different satellites and/or transponders, and the PTR 110 may be able to handle this reassignment as long as the PSI table 214 is updated.

TABLE 1

| Channel | Satellite | Transponder | ECM PID | Audio PIDs | Video PID |
|---------|-----------|-------------|---------|------------|-----------|
| 4 | 1 | 2 | 27 | 1001 | 1011 |
| 5 | 2 | 11 | 29 | 1002 | 1012 |
| 7 | 2 | 3 | 31 | 1003 | 1013 |
| 13 | 2 | 4 | 33 | 1003, 1004 | 1013 |

It should be understood that the values provided in Table 1 are for example purposes only. Actual values, including how satellites and transponders are identified, may vary. Additional information may also be stored in the PSI table 214. Video and/or audio for different television channels on different transponders may have the same PIDs. Such television channels may be differentiated based on which satellite and/or transponder to which a tuner is tuned.

DVR functionality of the PTR 110 may permit a television channel to be recorded for a period of time. The DVR database 216 may store timers that are used by the processors 202 to determine when a television channel should be tuned to and recorded to the DVR database 245 of storage medium 208. In some embodiments, a limited amount of space of the storage medium 208 may be devoted to the DVR database 216. Timers may be set by the service provider 102 and/or one or more users of the PTR 110. DVR functionality of the PTR 110 may be configured by a user to record particular television programs. The PSI table 214 may be used by the PTR 110 to determine the satellite, transponder, ECM PID, audio PID, and video PID.

The user interface 218 may include a remote control, physically separate from PTR 110, and/or one or more buttons on the PTR 110 that allows a user to interact with the PTR 110. The user interface 218 may be used to select a television channel for viewing, view information from the EPG database 210, and/or program a timer stored to the DVR database 216 wherein the timer may be used to control the DVR functionality of the PTR 110.

Referring back to the tuners 204a-h, television channels received via satellite may contain at least some encrypted or scrambles data. Packets of audio and video may be scrambled to prevent unauthorized users, such as nonsubscribers, from receiving television programming without paying the service provider 102. When one of the tuners 204a-h is receiving data from a particular transponder of a satellite, the transponder stream may be a series of data packets corresponding to multiple television channels. Each data packet may contain a PID, which in combination with the PSI table 214, can be determined to be associated with a particular television channel. Particular data packets, referred to as ECMs may be periodically transmitted. ECMs may be encrypted; the PTR 110 may use the smart card 222 to decrypt ECMs.

The smart card 222 may function as the CA (Controlled Access) which performs decryption of encryption data to obtain control words that are used to descramble video and/or audio of television channels. Decryption of an ECM may only be possible when the user (e.g., an individual who is associated with the PTR 110) has authorization to access the particular television channel associated with the ECM. When an ECM is received by the demultiplexer 220 and the ECM is determined to correspond to a television channel being stored and/or displayed, the ECM may be provided to the smart card 222 for decryption.

When the smart card 222 receives an encrypted ECM from the demultiplexer 220, the smart card 260 may decrypt the ECM to obtain some number of control words. In some embodiments, from each ECM received by the smart card 222, two control words are obtained. In some embodiments, when the smart card 222 receives an ECM, it compares the ECM to the previously received ECM. If the two ECMs match, the second ECM is not decrypted because the same control words would be obtained. In other embodiments, each ECM received by the smart card 222 is decrypted; however, if a second ECM matches a first ECM, the outputted control words will match; thus, effectively, the second ECM does not affect the control words output by the smart card 222. When an ECM is received by the smart card 222, it may take a period of time for the ECM to be decrypted to obtain the control words. As such, a period of time, such as about 0.2-0.5 seconds, may elapse before the control words indicated by the ECM can be obtained. The smart card 222 may be permanently part of the PTR 110 or may be configured to be inserted and removed from the PTR 110.

The demultiplexer 220 may be configured to filter data packets based on PIDs. For example, if a transponder data stream includes multiple television channels, data packets corresponding to a television channel that are not desired to be stored or displayed by the user may be ignored by the demultiplexer 255. As such, only data packets corresponding to the one or more television channels desired to be stored and/or displayed may be passed to either the descrambling engine 224 or the smart card 222; other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to the PSI table 214, may be appropriately routed by the demultiplexer 220.

The descrambling engine 224 may use the control words output by the smart card 222 in order to descramble video and/or audio corresponding to television channels for storage and/or presentation. Video and/or audio data contained in the transponder data stream received by the tuners 204a-h may be scrambled. The video and/or audio may be descrambled by the descrambling engine 224 using a particular control word. Which control word output by the smart card 222 to be used for successful descrambling may be indicated by a scramble control identifier present within the data packet containing the scrambled video or audio. Descrambled video and/or audio may be output by the descrambling engine 224 to the storage medium 208 for storage, such as part of the DVR database 216 for example, and/or to the decoder 226 for output to a television or other presentation equipment via the television interface 212.

For brevity, the PTR 110 is depicted in a simplified form, and may generally include more or fewer elements or components as desired, including those configured and/or arranged for enabling satellite television subscribers to bookmark and annotate sections of recorded media content, and also to share and access bookmarks with and created by others, as discussed in the context of the present disclosure. For example, the PTR 110 is shown in FIG. 2 to include the mixed mode module 120 as mentioned above in connection with FIG. 1. Further, some routing between the various modules of PTR 110 has been illustrated. Such illustrations are for exemplary purposes only. The state of two modules not being directly or indirectly connected does not indicate the modules cannot communicate. Rather, connections between modules of the PTR 110 are intended only to indicate possible common data routing. It should be understood that the modules of the PTR 110 may be combined into a fewer number of modules or divided into a greater number of modules.

Additionally, although not explicitly shown in FIG. 2, the PTR 110 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 110 may be configured to include any number of other various components or logical modules that are implemented in hardware, software, firmware, or any combination thereof, and such components or logical modules may or may not be implementation-specific.

Figure 3:
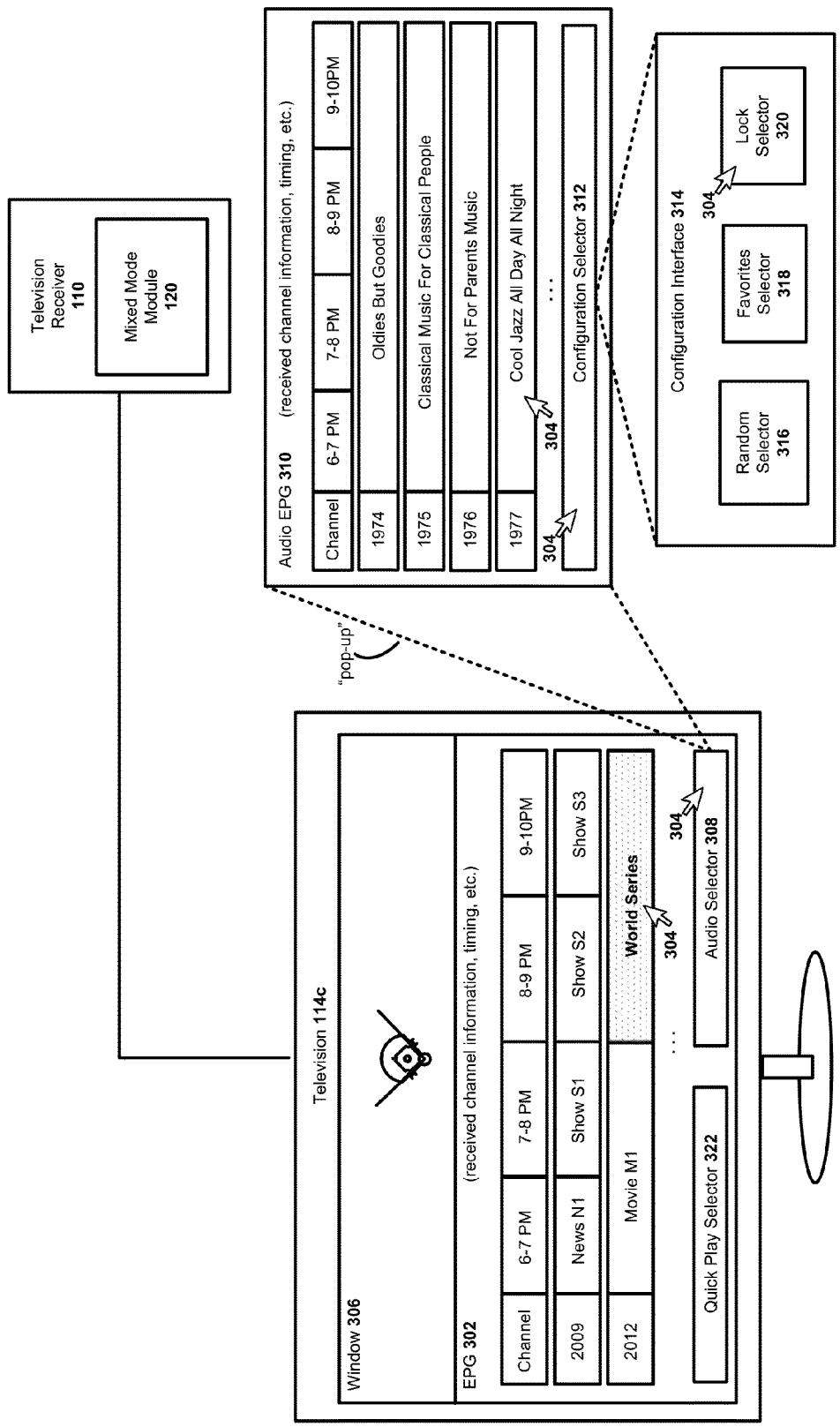
FIG. 3 shows first aspects of the example system of FIG. 1 in detail.

Referring now to FIG. 3, first aspects of the example system 100 of FIG. 1 are shown in detail. In particular, the PTR 110 may be configured to output an EPG (Electronic Programming Guide) 302 to and for presentation the television 114c for example. The EPG 302 may at least present various information related to television channels and the timing of programs or programming appearing on such television channels. For example, as shown in FIG. 3, the EPG 202 may display information associated with a channel 2012, where the "World Series" is listed as scheduled to appear on that channel starting at a particular time on a particular day, and etc. In this example, and assuming that a current time is sometime during the time period 8-10 PM, a viewer may manipulate a cursor 304 using a pointing device (not shown) to select, as shown by stipple shading in FIG. 3, the World Series for immediate viewing within a window 306 on the television 114c. Other embodiments are possible. For example, it is contemplated that any menu-driven navigation technique or implementation may be used to enable user-interaction with the EPG 302, along with other elements or interfaces output by the PTR 110 to the television 114c for display thereon.

In addition to the EPG 302, the PTR 110 may be configured to output various other interactive elements or interfaces. For example, the mixed mode module 120 of the PTR 110 may be configured to output an audio selector 308. In general, the audio selector 308 may be selected so that a viewer may interact with the mixed mode module 120 to simultaneously watch video associated with a primary television channel as displayed within the window 306 on the television 114c, and listen to audio associated with a different secondary television channel. For example, a viewer may manipulate the cursor 304 to select the audio selector 308, via a "point and double-click" action or "point and click" action or a "highlight and select" action using a remote control for example and, in response, the mixed mode module 120 may be configured to output an audio EPG 310 to and for presentation by the television 114c. In general, the audio EPG 310 is similar to the EPG 302.

For example, the audio EPG 310 may at least present various information related to television channels and the timing of programs or programming appearing on such television channels. However, the television channels displayed with the audio EPG 310 are typically only a subset of those normally displayed within the EPG 302. In particular, the television channels displayed with the audio EPG 310 are channels that when selected output audio, possibly along video that includes text that describes the audio being output or the type of audio being output, as a primary output. In other words, the audio EPG 310 may present so-called "music only" channels. For example, as shown in FIG. 3, the audio EPG 310 may display information associated with a channel 1977, "Cool Jazz All Day All Night," where a subscriber may easily discern that jazz music is scheduled to be output on that channel at a particular time on a particular day, and etc.

In this example, and assuming that a current time is sometime during the time period 6-10 PM, a viewer may manipulate a cursor 304 within the audio EPG 310 to select the icon or identifier associated with channel 1977, so that the mixed mode module 120 may pass audio to the television 114c that corresponds to the audio associated with channel 1977. Accordingly, while the video associated with the World Series would be currently output by the television 114c, the audio stream associated with the World Series would not currently being output by the television 114c. Rather, the audio stream associated with the channel 1977 would be currently being output by the television 114c. In this manner the audio selector 308 may be selected so that a viewer may interact with the mixed mode module 120 to simultaneously watch video associated with a primary television channel as displayed within the window 306 on the television 114c, and listen to audio associated with a different secondary television channel. Other embodiment are possible.

For example, a viewer may manipulate the cursor 304 to select within the audio EPG 310 a configuration selector 312 to activate or otherwise access a configuration interface 314. In this example, the mixed mode module 120 may be configured to output within the configuration interface 314 a random selector 316, a favorites selector 318, and a lock selector 320. In general, the random selector 316 may be selected so that after a predetermined and configurable time period, such as 10 minutes for example, the mixed mode module 120 may automatically and randomly switch from a first music only channel as listed within the audio EPG 310 (e.g., channel 1977), that is currently tuned to so that audio associated with that channel is currently output by the television 114c, to another different music only channel as listed within the audio EPG 310. In this manner, an individual may, with the "press of a button," activate the mixed mode module 120 to randomly switch between available music only channels. Other embodiments are possible. For example it is contemplated that the features or aspects of the present disclosure as discussed throughout do not necessarily have to apply to music only channels. For example, it is contemplated that the various interfaces output by the mixed mode module 120 to the television 114c may be defined or configured to enable a viewer to select audio from any particular television channel as desired, regardless of television channel type.

The favorites selector 318 may be selected to define a "favorite" music only channel. In this example, when a quick play selector 322, as displayed within the EPG 302 in FIG. 3, is selected the mixed mode module 120 may automatically tune to that favorite music only channel so that audio output by the television 114c corresponds to the audio associated with that channel. The lock selection 320 may be selected to restrict access to a particular music only channel. For example, in a parental control scenario, a parent may access the lock selection 320 and following password verification that parent may lock-out the channel 1976, "Not For Parents Music," so that a minor cannot access the audio EPG 310 and/or the EPG 302 to select and listen to the audio associated with the channel 1976. It is contemplated that the mixed mode module 120 may be configured such that other customization features may be made accessible via the configuration interface 314 as well.

Figure 4:
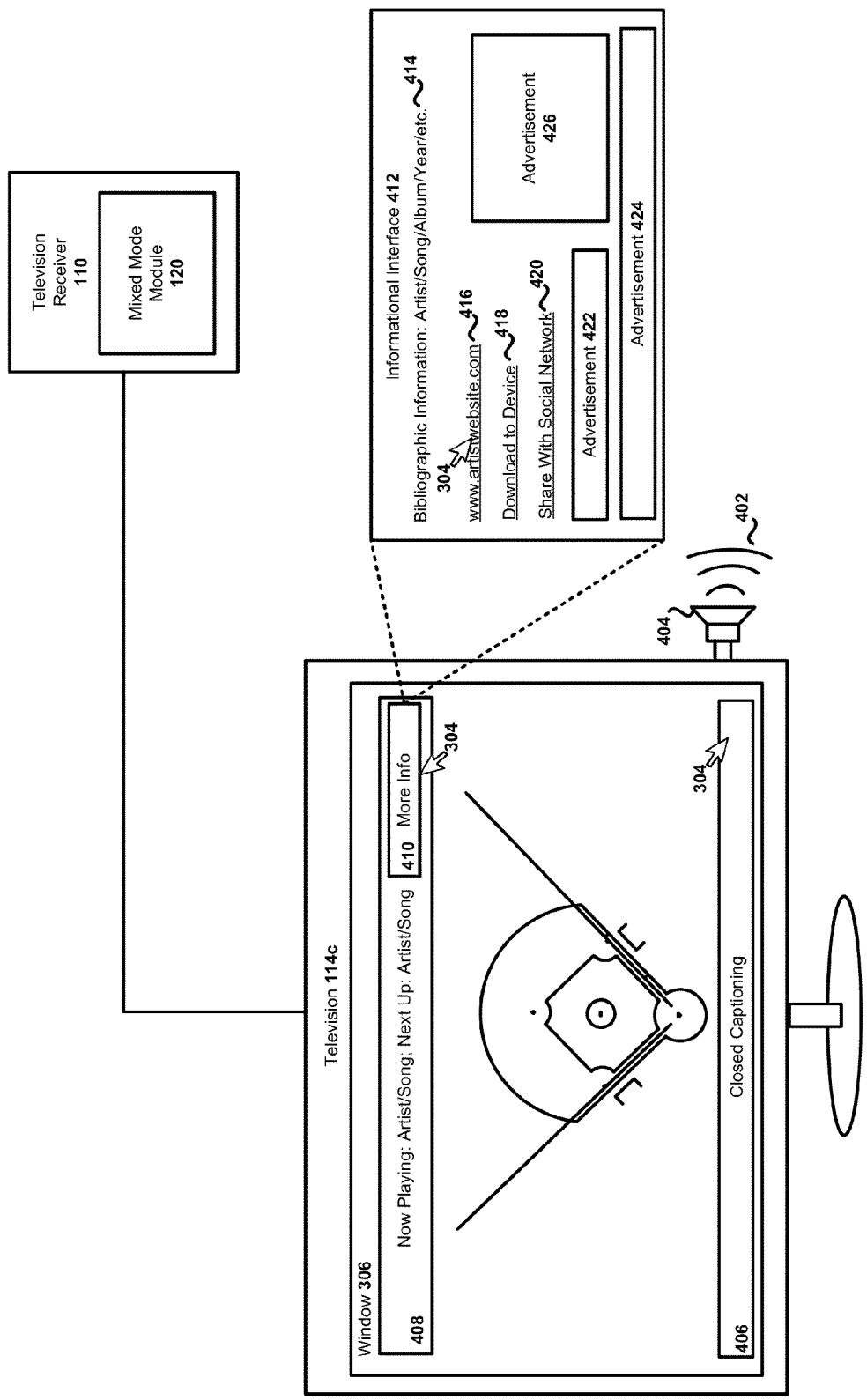
FIG. 4 shows second aspects of the example system of FIG. 1 in detail

Referring now to FIG. 4, second aspects of the example system 100 of FIG. 1 are shown in detail. In this example, it is assumed that a viewer has selected the World Series for immediate viewing within the window 306 on the television 114c, as discussed above in connection with FIG. 3. It is further assumed that the viewer has selected the quick play selector 322 within the EPG 302, so that while video associated with the World Series is currently output by the television 114c within the window 306, audio associated with a favorite music channel is currently output by the television 114c. This is illustrated in FIG. 4 by the output 402 of a speaker 404 of the television 114c.

In the example embodiment, closed-captioning 406 that is associated with particular audio from the channel 2012 during the broadcast of the World Series is displayed within the window 306, in addition to the display of the video associated with the World Series within the window 306. In this manner, a television viewer may more fully engage in watching the video associated with the World Series, while simultaneously listening to the audio associated with the favorite music channel is currently output by the television 114c. Additionally, an interactive banner 408 is displayed within the window 306. It is contemplated that the banner 408 may display any of a plurality of various information associated with audio that is currently being output by the television 114c. That audio being associated with a favorite music channel based on the selection of the quick play selector 322 as mentioned above.

For example, the banner 408 may display (e.g., static or scrolling display) the text "Now Playing: Artist/Song" so that while watching the banner 408 a viewer may come to an understanding of what audio is currently being output by the television 114c. Many other embodiments are possible as well. For example, the banner 408 may display "Previous: Artist/Song" or "Next Up: Artist/Song" so that while watching the banner 408 a viewer may come to an understanding of what audio has been or will be subsequently output by the television 114c. Other embodiments are possible. For example, the banner 408 may display a graphic or numeric number that identifies the above-mentioned favorite music channel. Still other embodiments are possible.

For example, in some embodiments, the banner 408 may display a more info selection 410. In this example, a viewer may manipulate the cursor 304 to select the more info selection 410 and access an informational interface 412. In response, the mixed mode module 120 may be configured to output, within the informational interface 412 any of a plurality of various information associated with audio that is currently being output by the television 114c. For example, the informational interface 412 may display a plurality of bibliographic information 414, such as "Artist/Song/Album/etc.," associated with audio that is currently being output by the television 114c. In some embodiments, the informational interface 412 may display a first hyperlink 416 to a website of an artist associated with audio that is currently being output by the television 114c. When the first hyperlink 416 a browser window may open up and be displayed within the window 306 so that a viewer may navigate that website. In some embodiments, the informational interface 412 may display a second hyperlink 418 that when selected automatically downloads a song associated with audio that is currently being output by the television 114c to a particular device, such a media player.

In some embodiments, the informational interface 412 may display a third hyperlink 420 that when selected automatically posts information (e.g., "I Like This Song: Artist/Song") to a social network, such as Facebook or Twitter for example, associated with a song associated with audio that is currently being output by the television 114c. In each of the examples discussed in connection with the informational interface 412, configuration information may have been previously supplied to the mixed mode module 120 (e.g., via configuration interface 314) so that the mixed mode module 120 may implement respective actions. Further, it is contemplated that if when selecting to post information to a social network, certain information may be included in the post that identifies where the source of listening to the audio came from. For instance, the text "I just heard this on Content Provider's audio channel" may also be posted thus providing an advertisement for that content provider on the social site so that others may be exposed to the service that is offered by the content provider.

In addition to the plurality of various information displayed within the informational interface 412 that is associated with audio that is currently being output by the television 114c, it is contemplated that the informational interface 412 may display one or more targeted advertisements, such as a first advertisement 422, a second advertisement 424, and a third advertisement 426 as shown in FIG. 4. In this example, as discussed in further detail below in connection with FIG. 5, any one of the targeted advertisements displayed within the informational interface 412 may include a service or package offered by the service provider 102 as part of a campaign to sell that service or package. That service or package may be selected based on a deduction that any particular subscriber or customer who takes the time to access the informational interface 412 during the time that a song associated with audio that is currently being output by the television 114c is being played is very likely to be interested in that type of media or media content.

For example, the first advertisement 422 may present a tailor-made subscription-based package offered by the service provider 102 whose content is "All Movies Or Documentaries That Have Something To Do With Jazz," and as part of a campaign to sell that package may include information about the package whereby the package is currently available at a discount of "25% off if subscribed to within the next 3 days." Many other embodiments are possible as well. For example, the second advertisement 424 may present an option to buy the most recent album of an artist associated with audio that is currently being output by the television 114c. In this example, the service provider 102 may charge a fee and thus derive revenue from a particular third party in return for presenting such an advertisement. Other embodiments are possible. For example, the third advertisement 426 may present an option to buy a ticket to a particular jazz concert festival. Again, the service provider 102 may charge a fee and thus derive revenue from a particular third party in return for presenting such an advertisement. Still other embodiments are possible as well.

Figure 5:
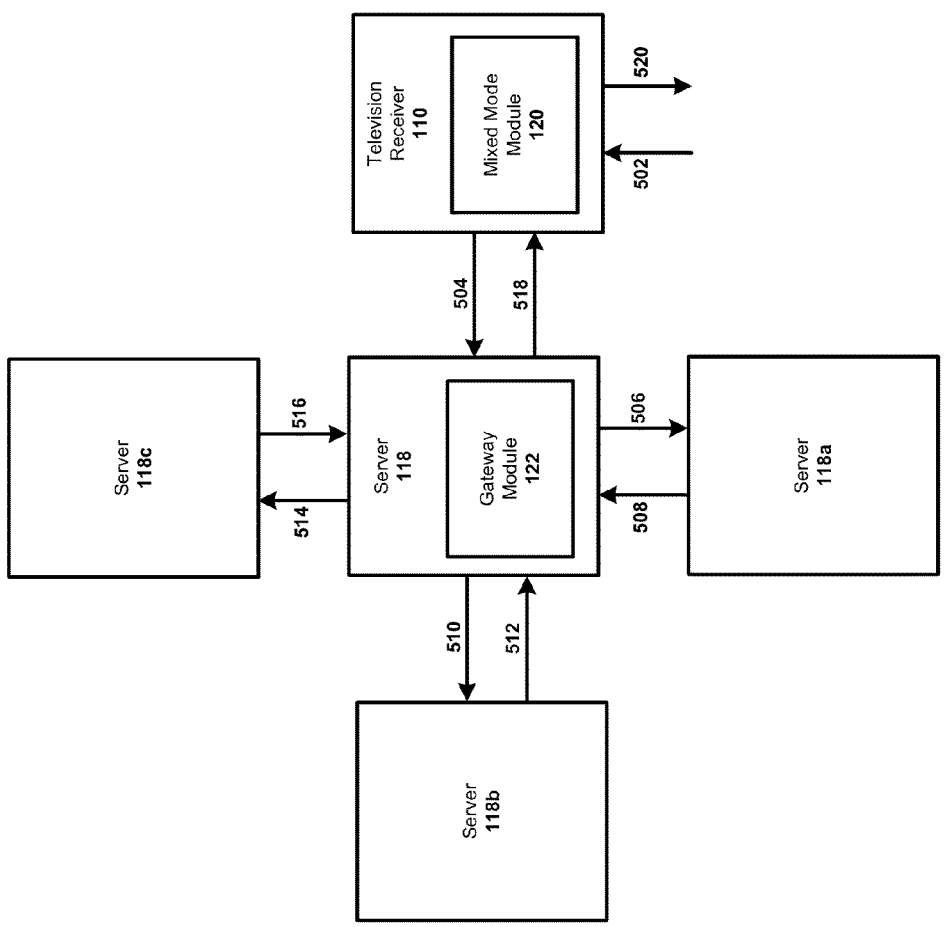
FIG. 5 shows third aspects of the example system of FIG. 1 in detail

Referring now to FIG. 5, third aspects of the example system 100 of FIG. 1 are shown in detail. In particular, FIG. 5 shows the PTR 110 and the server 118 of FIG. 1, along with a number of other servers 118a-c. In this example, the server 118 is associated with the service provider 102, whereas each of the servers 118a-c may be associated with at least one particular third party. Any particular third party may be engaged in a business relationship with an entity associated with the service provider 102.

In practice, the mixed mode module 120 may receive a first command 502 from the television 114c in response to user-selection of the more info selection 410 of the banner 408 as shown in FIG. 4. The mixed mode module 120 may then determine or identify basic bibliographic information, such as Artist/Song, that is associated with audio currently being output by the television 114c. The mixed mode module 120 may then query 504 the gateway module 122 to request content for insertion into the informational interface 412. In this example, the gateway module 122 may make a determination as to what specific content to return to the mixed mode module 120, so that the mixed mode module 120 may populate the informational interface 412 with content as preferred by the content provider 102. In some embodiments, some of that content may be immediately accessible to or for the gateway module 122. In some embodiments, some of that content may not be immediately accessible to or for the gateway module 122.

For example, in some embodiments, the gateway module 122 may determine to retrieve and return to the mixed mode module 120 further bibliographic information, such as Album/Year/etc., that may be immediately accessible within a locally accessible database to or for the gateway module 122. In addition, the gateway module 122 may determine to retrieve and return to the mixed mode module 120 content associated with the first advertisement 422 as discussed above, and that content may be immediately accessible within a locally accessible database to or for the gateway module 122. In some embodiments though, the gateway module 122 may determine to retrieve and return to the mixed mode module 120 content associated with one or more of the first hyperlink 416, second hyperlink 418, third hyperlink 420, second advertisement 424, and the third advertisement 426, and that content respectively may not be immediately accessible to or for the gateway module 122. Here, the gateway module 122 may query one or more of the servers 118a-c to retrieve the desired content.

For example, the gateway module 122 may query 506 the server 118a to retrieve content associated with the first hyperlink 416, second hyperlink 418, and third hyperlink 420. In response, the server 118a may reply 508 with content associated with the first hyperlink 416, second hyperlink 418, and third hyperlink 420. Further, the gateway module 122 may query 510 the server 118b to retrieve content associated with second advertisement 424. In response, the server 118b may reply 512 with content associated with the second advertisement 424. Further, the gateway module 122 may query 514 the server 118c to retrieve content associated with third advertisement 426. In response, the server 118c may reply 516 with content associated with the third advertisement 426. Other embodiments are possible.

Upon accumulation and/aggregation of all content determined by the gateway module 122 to be returned to the mixed mode module 120 in response to the original query 504, the gateway module 122 may send a reply 518 to the mixed mode module 120. In the present example this may include data or content associated with each of the bibliographic information 414, first hyperlink 416, second hyperlink 418, third hyperlink 420, first advertisement 422, second advertisement 424, and third advertisement 426. The mixed mode module 120 may then format the data or content and pass 520 that data or content to the television 114c so that the television 114c may display that data or content within the informational interface 412. For brevity, the communication sequence between the respective components of FIG. 5 has been simplified. Underlying communication protocols along with data formatting and other technical aspects may or may not be implementation-specific. Other embodiments are possible.

Figure 6:
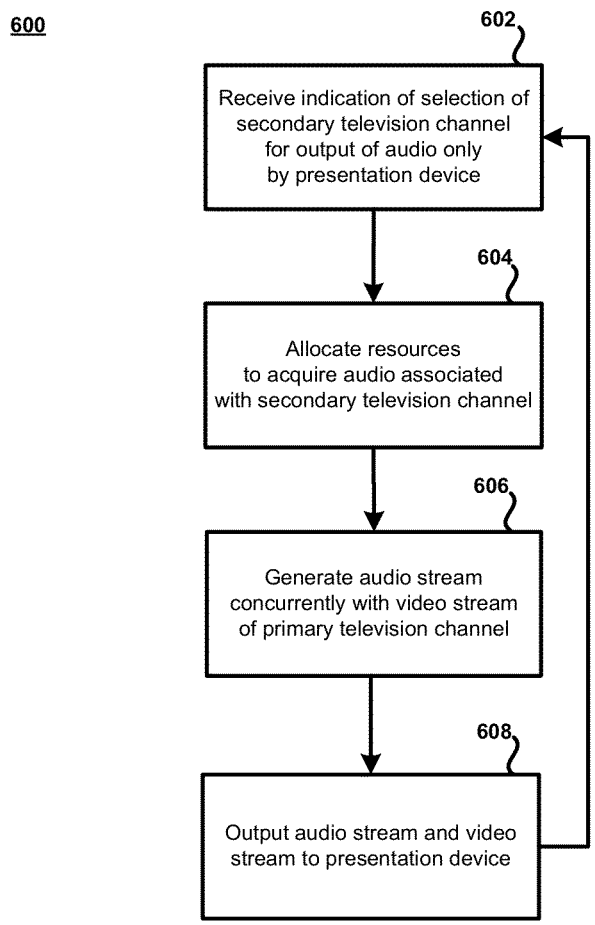
FIG. 6 shows a first example method in accordance with the disclosure.

Referring now to FIG. 6, a first example method 600 is shown in accordance with the disclosure. The various steps or modules of the method 600 may be performed by the PTR 110 of FIG. 1. Other embodiments are possible. For example, one or more various steps or modules of the method 600 may be performed by one or more of the other elements of FIG. 1.

At step 602, the PTR 110 may receive or detect an indication of selection of a secondary television channel for output of audio only by a presentation device. For example, a viewer may manipulate a cursor 304 within the audio EPG 310 as shown in FIG. 3 to select the icon or identifier associated with the channel 1977, "Cool Jazz All Day All Night," so that the mixed mode module 120 of the PTR 110 may ultimately pass audio to the television 114c that corresponds to the audio associated with the channel 1977. Other embodiments are possible.

At step 604, the PTR 110 may allocate resources to acquire audio associated with the secondary television channel. For example, the PTR 110 may at least allocate tuner and decoding resources so that the PTR 110 may acquire and process a data stream associated with a particular satellite transponder to acquire the audio associated with the secondary television channel. For brevity, actions performed by the PTR 110 at step 604 are simplified. Other steps may acquire and may be consistent with the description provided above in connection with FIG. 3.

At step 606, the PTR 110 may generate an audio stream associated with the secondary television channel concurrently with a video stream associated with a primary television channel. For example, the PTR 110 may generate an audio stream associated with the channel 1977 while simultaneously generating a video stream associated with the World Series broadcast on channel 2012 as discussed above in connection with FIG. 3. In general, to generate the respective audio and video streams, the PTR 110 may select and process particular data packets based on PID information similar to that as discussed above in connection with at least Table 1.

At step 608, the PTR 110 may output the audio stream associated with the secondary television channel concurrently with the video stream associated with a primary television channel, for display and/or output by the above-mentioned presentation device. For example, as shown in FIG. 4, the television 114c may simultaneously output the World Series for display within the window 306 for immediate viewing along with the audio associated with the channel 1977, as illustrated by the output 402 of the speaker 404 of the television 114c. Other embodiments are possible.

Figure 7:
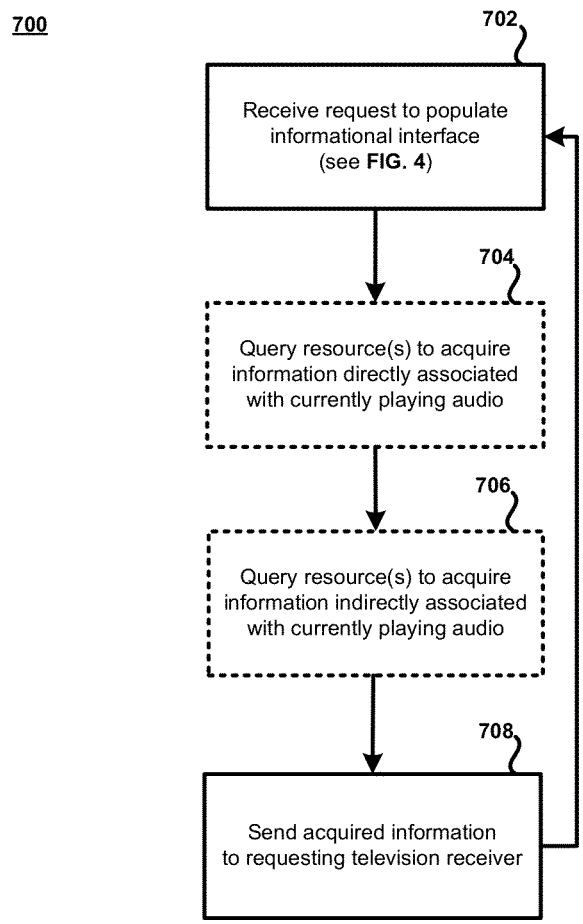
FIG. 7 shows a second example method in accordance with the disclosure.

Referring now to FIG. 7, a second example method 700 is shown in accordance with the disclosure. The various steps or modules of the method 700 may be performed by the server 118 of FIG. 1. Other embodiments are possible. For example, one or more various steps or modules of the method 700 may be performed by one or more of the other elements of FIG. 1.

At step 702, the server 118 may receive or detect a request to populate the informational interface 412 as shown in FIG. 4. For example, the server 118 may receive a request from the mixed mode module 120 of the PTR 110 for content for insertion into the informational interface 412, based on audio currently being output by the television 114c. In this example, the server 118 may make a determination as to what specific content to return to the mixed mode module 120, so that the mixed mode module 120 may populate the informational interface 412 with content as preferred by the content provider 102.

For example, at step 704, the server 118 may optionally (indicated by intermittent line in FIG. 7) determine to query one or both of a local resource(s) and a non-local resource(s) to retrieve content directly associated with audio currently being output by the television 114c. For example, the server 118 may determine to retrieve bibliographic information, such as Album/Year/etc., that may be immediately accessible within a locally accessible database to or for the gateway module 122. In another example, the server 118 may determine to retrieve content associated with the first advertisement 422, possibly along with content associated with the first hyperlink 416, second hyperlink 418, and third hyperlink 420, as discussed above in connection with FIG. 4, one or more of which may be accessible from at least one of the servers 118a-c. Other embodiments are possible.

For example, at step 706, the server 118 may optionally determine to query one or both of the local resource(s) and the non-local resource(s) to retrieve content indirectly associated with audio currently being output by the television 114c. For example, the server 118 may determine to retrieve content associated with one or both of the second advertisement 424 and the third advertisement 426, as discussed above in connection with FIG. 4, one or more of which may be accessible from at least one of the servers 118a-c. Other embodiments are possible.

Continuing with the present example, at step 708, the server 118 may send to the PTR 110 all content or data as retrieved from one or both of the local resource(s) and the non-local resource(s). Accordingly, this may include data or content associated with at least one of the bibliographic information 414, first hyperlink 416, second hyperlink 418, third hyperlink 420, first advertisement 422, second advertisement 424, and third advertisement 426 as shown within the information interface 412 of FIG. 4. Other embodiments are possible.

It is contemplated that certain aspects of the present disclosure, such as being able to view video while listening to audio from a different channel, may be possible without a connection between the PTR 110 and the network 124 or external servers 118. For example, in the absence of an connection to network 124 connection, while manipulating the user interface, channel information and PID information for an alternate audio channel may still be available locally, so that the audio EPG 310 (and EPG 302) may still be displayed for selection along with the functionality of the configuration selector 312, configuration interface 314, etc. Information used to populate information interface 412 though may not necessarily be available when there is no connection to the network 124. It is contemplated though that at least a portion of this information may be sent over the satellite network and received via element 108 to the PTR 110 and stored locally in a cache so that when element 410 is selected some if not all of the information that may normally presented with the element 412 when there is a connection to the network 124 mat still be presented within the element 412.

Figure 8:
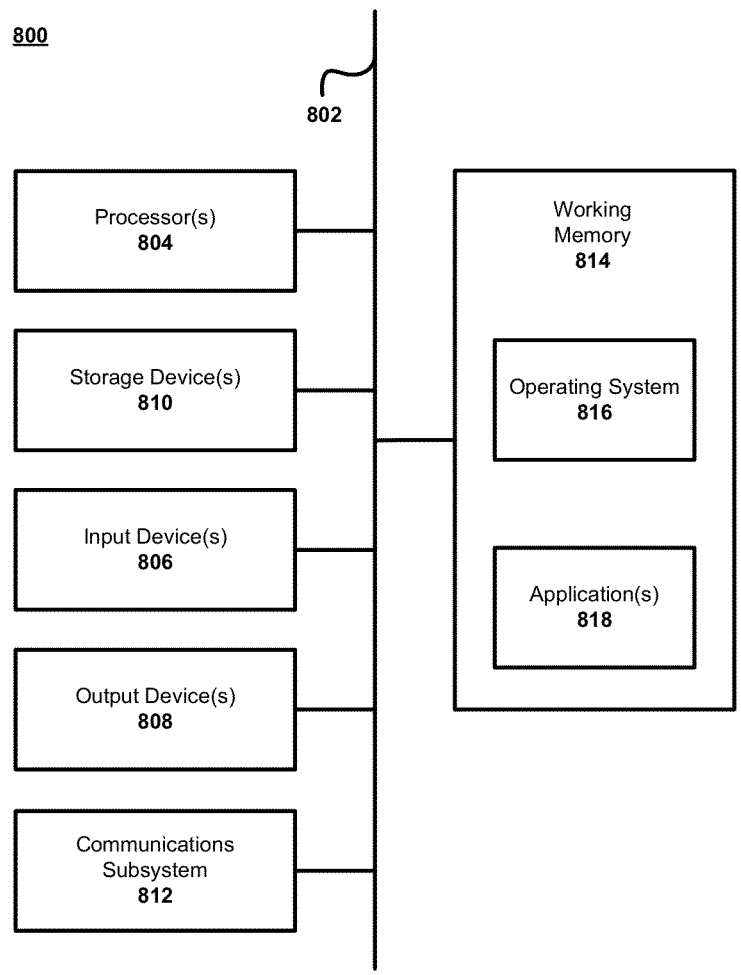
FIG. 8 shows an example computing system or device.

FIG. 8 shows an example computer system or device 800 in accordance with the disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 800, such as any of the respective elements of at least FIG. 1. In this manner, any of one or more of the respective elements of at least FIG. 1 may be configured to perform and/or include instructions that, when executed, perform the method of FIG. 6 and/or the method of FIG. 7. Still further, any of one or more of the respective elements of at least FIG. 1 may be configured to perform and/or include instructions that, when executed, instantiate and implement functionality of the PTR 110 and/or the server(s) 118.

The computer device 800 is shown comprising hardware elements that may be electrically coupled via a bus 802 (or may otherwise be in communication, as appropriate). The hardware elements may include a processing unit with one or more processors 804, including without limitation one or more general-purpose processors and/or one or more special-purpose processors (such as digital signal processing chips, graphics acceleration processors, and/or the like); one or more input devices 806, which may include without limitation a remote control, a mouse, a keyboard, and/or the like; and one or more output devices 808, which may include without limitation a presentation device (e.g., television), a printer, and/or the like.

The computer system 800 may further include (and/or be in communication with) one or more non-transitory storage devices 810, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 800 might also include a communications subsystem 812, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 812 may permit data to be exchanged with a network (such as the network described below, to name one example), other computer systems, and/or any other devices described herein. In many embodiments, the computer system 800 will further comprise a working memory 814, which may include a random access memory and/or a read-only memory device, as described above.

The computer device 800 also may comprise software elements, shown as being currently located within the working memory 814, including an operating system 816, device drivers, executable libraries, and/or other code, such as one or more application programs 818, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 810 described above. In some cases, the storage medium might be incorporated within a computer system, such as computer system 800. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 800) to perform methods in accordance with various embodiments of the disclosure. According to a set of embodiments, some or all of the procedures of such methods are performed by the computer system 800 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 may cause the processor(s) 804 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 800, various computer-readable media might be involved in providing instructions/code to processor(s) 804 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 810. Volatile media may include, without limitation, dynamic memory, such as the working memory 814.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 804 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 812 (and/or components thereof) generally will receive signals, and the bus 802 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804.

It should further be understood that the components of computer device 800 can be distributed across a network. For example, some processing may be performed in one location using a first processor while other processing may be performed by another processor remote from the first processor. Other components of computer system 800 may be similarly distributed. As such, computer device 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:

outputting, by a television receiver, audio and video associated with a first television channel to a presentation device for output by the presentation device;

receiving, by the television receiver, a request to output audio associated with a second television channel to the presentation device for output by the presentation device;

outputting, by the television receiver in response to the receiving the request, only video associated with the first television channel, and audio associated with the second television channel, to the presentation device both for output by the presentation device, wherein the audio associated with the second television channel is unassociated with the audio associated with the first television channel; and outputting to the presentation device for display by the presentation device an indicator that when selected generates a request to output audio associated with a random television channel other than the first television channel.

2. The method of claim 1, further comprising outputting to the presentation device for display by the presentation device an electronic programming guide that includes an indicator that presents available audio associated with the second television channel.

3. The method of claim 1, further comprising outputting to the presentation device for display by the presentation device an indicator that when selected generates the request to output audio associated with the second television channel.

4. The method of claim 1, further comprising outputting to the presentation device for display by the presentation device an indicator that when selected provides an option to define the second television channel of priority greater than other television channels.

5. The method of claim 1, further comprising outputting to the presentation device for display by the presentation device an indicator that when selected provides an option to restrict access to audio associated within a television channel other than the first television channel.

6. The method of claim 1, further comprising outputting to the presentation device for display by the presentation device closed-captioning content associated with the first television channel.

7. The method of claim 1, further comprising outputting to the presentation device for display by the presentation device textual content associated with the audio of the second television channel.

8. The method of claim 1, further comprising outputting to the presentation device for display by the presentation device an indicator that when selected generates a request for the television receiver to output an interface that presents content associated with the audio of the second television channel.

9. The method of claim 1, further comprising outputting to the presentation device for display by the presentation device an indicator that when selected activates the television receiver to contact a network-based resource other than the television receiver over a communication interface.

10. The method of claim 1, further comprising outputting to the presentation device for display by the presentation device an indicator that when selected generates a request for the television receiver to output an interface that presents advertisement content associated with the audio of the second television channel.

11. A television receiver, comprising:

one or more processors; and a memory communicatively coupled with and readable by the one or more processors and having stored therein processor-readable instructions that, when executed by the one or more processors, cause the one or more processors to:

output audio and video associated with a first television channel to a presentation device for output by the presentation device;

detect a request to output audio associated with a second television channel to the presentation device for output by the presentation device;

output in response to the receiving the request, video associated with the first television channel, and audio associated with the second television channel, to the presentation device both for output by the presentation device, wherein the audio associated with the second television channel is unassociated with the audio associated with the first television channel;

output to the presentation device for display by the presentation device an indicator that when selected generates a request to output audio associated with a random television channel other than the first television channel.

12. The television receiver of claim 11, wherein the memory having stored therein processor-readable instructions which, when executed by the one or more processors, cause the one or more processors to:

output to the presentation device for display by the presentation device an electronic programming guide that includes an indicator that presents available audio associated with the second television channel.

13. The television receiver of claim 11, wherein the memory having stored therein processor-readable instructions which, when executed by the one or more processors, cause the one or more processors to:

output to the presentation device for display by the presentation device an indicator that when selected generates the request to output audio associated with the second television channel.

14. The television receiver of claim 11, wherein the memory having stored therein processor-readable instructions which, when executed by the one or more processors, cause the one or more processors to:

output to the presentation device for display by the presentation device an indicator that when selected provides an option to define the second television channel of priority greater than other television channels.

15. The television receiver of claim 11, wherein the memory having stored therein processor-readable instructions which, when executed by the one or more processors, cause the one or more processors to:

output to the presentation device for display by the presentation device an indicator that when selected generates a request for the television receiver to output an interface that presents advertisement content associated with the audio of the second television channel.

16. The television receiver of claim 11, wherein the memory having stored therein processor-readable instructions which, when executed by the one or more processors, cause the one or more processors to:

output to the presentation device for display by the presentation device closed-captioning content associated with the first television channel.

17. The television receiver of claim 11, wherein the memory having stored therein processor-readable instructions which, when executed by the one or more processors, cause the one or more processors to:

output to the presentation device for display by the presentation device an indicator that when selected activates the television receiver to contact a network-based resource other than the television receiver over a communication interface.

18. A method for operating a television receiver in a mixed mode, comprising outputting by the television receiver audio and video associated with a first television channel to a presentation device;

outputting by the television receiver to the presentation device an indicator that when selected generates a request to output audio associated with a second television channel simultaneously with the video associated with the first television channel;

receiving by the television receiver a request to output audio associated with the second television channel to the presentation device;

outputting by the television receiver in response to receiving the request video associated with the first television channel, and audio associated with the second television channel, to the presentation device both for output by the presentation device, wherein the audio associated with the second television channel is unassociated with the audio associated with the first television channel; and outputting to the presentation device for display by the presentation device an indicator that when selected generates a request to output audio associated with a random television channel other than the first television channel.

* * * * *